United States Patent Office 3,529,056
Patented Sept. 15, 1970

3,529,056
METHOD OF PRODUCING JOWL ABSCESS VACCINE
Harlen J. H. Engelbrecht, Fort Dodge, Iowa, assignor to American Home Products Corporation, New York, N.Y., a corporation of Delaware
No Drawing. Filed May 7, 1968, Ser. No. 727,338
Int. Cl. C12k 5/00
U.S. Cl. 424—92           5 Claims

ABSTRACT OF THE DISCLOSURE

A method of preparing a live vaccine for preventing hog jowl abscess disease (due to a Lancefield Group E Streptococcus infection) is described, which method comprises culture of Group E Streptococcus isolated from clinical cases of hog jowl abscess in gradually increasing concentrations of acriflavine until a culture of the Streptococci is obtained which is less hemolytic than the fully virulent when grown on blood agar and is capable, when orally administered, of conferring immunity on susceptible swine without causing any clinical symptoms of disease.

---

This invention relates to a vaccine for the prevention of the condition generally known as jowl abscess, feeder boils, cervical abscesses or strangles in swine, and to methods of preparing and using the same.

According to experts assembled at the 6th National Pork Industry conference at Madison, Wis., in November of 1963, the pork producing and processing industry suffers an annual loss of from $11,000,000 to $12,000,000 as a result of jowl abscesses in hogs, caused by Group E Streptococci. Infection of other species by Group E Streptococci is rare, but in swine they result in serious losses by damage to carcasses caused by the abscesses characteristic of chronic infections.

While there is still some question as to the preferred scientific designation of the causative organism, it seems generally agreed that it is a beta hemolytic Streptococcus of Lancefield's Group E. Collier has proposed the name *Streptococcus suis* (J.A.V.M.A., vol 146:344–47, 1965). There is no difficulty, apparently, in recovering this organism from affected swine, since it has been recovered from 85–95% of cervical abscesses found in slaughtered swine, and since it is normal for from 5–15% of all slaughter-house swine to have these abscesses.

It has been shown that infection ordinarily occurs by the oral route, with invasion of the lymphatics.

I have found, surprisingly, that an extremely virulent culture of a Group E Streptococcus recovered from a pig jowl abscess may be cultured in the presence of gradually increasing concentrations of acriflavine until the said culture is modified to the extent that it no longer causes jowl abscesses but does cause pigs, to which it is administered orally, to develop immunity to infection by virulent field strains of the causative organism. Accordingly, it has now become possible to prepare a vaccine containing this attenuated strain of a Group E Streptococcus, which vaccine can be administered orally to susceptible swine, causing them to develop an immunity to infection by the virulent organism. In this way, it is possible to raise swine unblemished by jowl abscesses due to a Group E Streptococcus infection. Such swine bring higher prices to the producer, and seem to require less time and feed to bring them to market condition.

A field isolation of a Group E Streptococcus was made from pus taken from the severely abscessed jowl of a breeding sow. This organism was found to grow well in horse infusion broth containing 10% equine serum, and it was found that jowl abscesses could easily and reproducibly be induced in most pigs by swabbing their throats with 0.5 to 5 cc. of culture medium containing about $5 \times 10^9$ per ml. viable cells of the virulent organism; abscesses developed within 14 days of challenge.

For growth of both the virulent organism and my attenuated strain, horse infusion broth containing 10% horse serum is suitable. Such a broth may be prepared by combining:

Horse meat stock (an infusion from two liters of distilled water for each pound of horse meat) ml__ 450
Buffer solution (containing 2.73 grams $KH_2PO_4$ and 8.17 grams $Na_2HPO_4$) _____ ml__ 100
Neopeptone (Difco) _____ g__ 10
Dextrose _____ g__ 3
Sodium chloride _____ g__ 5
Distilled water to make to 1000 ml.

The pH is adjusted, if necessary, to 7.0–7.2 by addition of sodium hydroxide or hydrochloric acid, and the mixture is sterilized by autoclaving. After cooling the sterilized broth to room temperature, the 10% sterile horse serum is added.

The virulent field-isolated organism was seeded into a number of portions of the above broth and varying amounts of acriflavine were added. It was found that the organism would grow slowly at a level of 1 part acriflavine per million parts of broth, but that growth was not observed at a level of 4 parts acriflavine per million parts of broth.

The organism was passaged six times in broth containing 1:1,000,000 acriflavine; growth rate was poor at first, but improved to approximately normal rates in the later passages. Acriflavine content was then increased to 2:1,000,000, and four passages were made at this level, followed by seven at 3:1,000,000. At each increased level of acriflavine concentration, growth was at first a little slower than at the lower concentration, but after a few passages adaptation seemed to occur. Five passages at 4:1,000,000, two at 5:1,000,000, two at 6:1, 000,000, one at 7:1,000,000, fifteen at 8:1,000,000 and one at 9:1,000,000 were made.

Inoculum from the growth at 9:1,000,000 acriflavine concentration was spread onto a blood agar plate and found to grow very well. A horse infusion broth tube was seeded with colonies selected from this plate, and passage was continued, as above outlined, through increasing concentrations of acriflavine up to a maximum concentration of 84:1,000,000.

Experimental vaccines were made by growing, in acriflavine-free medium, the organisms adapted to growth in acriflavine concentrations of 74:1,000,000 and 45:1,000,000; these live cultures were introduced into the throats of susceptible hogs. The 74:1,000,000 product gave no indications of providing immunity to later challenge, but the 45:1,000,000 product appeared to give some protection when administered in large amounts. Neither of these experimental vaccines caused any adverse reactions in vaccinates.

From this it was concluded that modification of the organism had been carried too far, and that better properties might be found at some of the lower passage levels. Attention was accordingly directed to organisms adapted to growth at acriflavin levels of 9:1,000,000 to 20:1,000,000. At the 9:1,000,000 and 10:1,000,000 stages, the sugar fermentation reactions appeared to be the same as for the original, fully virulent field isolate; i.e., the organism fermented trehalose, sorbitol, and salicin, but did not ferment raffinose, lactose, and inulin. At the 15:-1,000,000, 17:1,000,000, and 20:1,000,000 stages, trehalose was fermented, but sorbitol, salicin, raffinose, lactose, and inulin were not fermented.

The 14:1,000,000 stage was then plated onto a blood agar plate (no acriflavine added), and two distinct types of colonies were noted and separately subcultured. One was strongly hemolytic and had the sugar fermentation reactions of the fully virulent organism; the other was only very weakly hemolytic, and had the modified sugar fermentation reactions described above. Each of these separate lines was grown in acriflavine-free horse infusion broth, and the resulting cultures were each administered to four susceptible hogs by spraying into their throats.

The more hemolytic culture caused a slight rise in temperature, but this rise was not as great as is normally caused by introduction of the fully virulent organism. The less hemolytic line caused no temperature rise. All eight hogs were slaughtered after 14 days; a few jowl abscesses were found in the hogs administered the more hemolytic organism, but none were found in the hogs administered the less hemolytic organism.

Another group of four hogs was similarly treated with the less hemolytic organism; there was no temperature rise from the vaccination. The vaccinates and a group of unvaccinated controls were thereafter (14 days) challenged orally with the fully virulent organism; there was a temperature rise, with abscess formation, in the controls, but vaccinates showed neither temperature rise nor abscess formation. It was concluded that this organism was well-suited for use in a vaccine.

This organism has been deposited in and is available from the American Type Culture Collection at Rockville, Md., where it is designated as No. 21223. In addition to the sugar fermentation behavior referred to above, it is further characterized by somewhat slower growth in horse infusion broth containing 10% horse serum when compared to the fully virulent organism.

Growing this organism for production of vaccine presents no unusual problems. Solid or liquid media may be employed, though liquid media are preferred for production of large amounts. Sterile culture medium such as horse infusion broth containing 10% horse serum may be inoculated with a vigorously growing seed culture and incubated at 35–37° C. under agitation for from 2 to 24 hours; four to five hours are usually sufficient. Growth may be conveniently monitored by determining the light transmission of the growing culture, and harvesting the product when light transmission has ceased to undergo substantial change. The product then contains about $10^8$–$10^9$ organisms per cc., and is suitable for use as a vaccine at once without further treatment.

Ordinarily, however, I prefer to freeze-dry the vaccine to permit storage for relatively long periods, and to reconstitute the freeze-dried vaccine immediately prior to use. The freshly-grown cultures may be freeze-dried directly without additives or stabilizers if desired, but I find that a superior product from the standpoint of stability and ease of reconstitution can be prepared by adding sterile skim milk to a concentration of from about 20 to 50% by volume prior to filling into dosage vials, freezing, and drying.

The dried vaccine may be reconstituted by addition of water or physiological saline solution. A preferred diluent for use in reconstituting this vaccine comprises a sterile aqueous solution of 1.0% Bacto-Peptone (Difco) and 0.25% sodium chloride adjusted to a pH between 6.8 and 7.2; sterilization of this diluent is conveniently effected by autoclaving at 15 p.s.i. superatmospheric pressure.

A suitable single dose of vaccine may correspond to 0.5 ml. of culture-skim milk mixture prior to freeze-drying. This may be reconstituted to its original volume or to up to ten times its original volume. Reconstitution to four times the original volume is preferred. Exact control of vaccine dosage is not particularly critical, since 10-fold overdoses do no harm and afford satisfactory protection.

Vaccination with my novel vaccine is preferably done by spraying the freshly reconstituted vaccine into the animals' throats in the region of their tonsils or by swabbing it onto these areas. It appears that only the vaccine caused to adhere to these throat tissues is effective, and that amounts that pass on into the stomach are lost and without effect. This is consistent with what is known about natural infection, and challenge doses of virulent organisms are similarly administered.

In order to assess the risk of reversion to virulence by this vaccine strain of organisms, it was passed successively through five pigs, with the Streptococci being recovered each time from the mandibular lymph nodes, cultured in horse infusion broth, and administered to the next pig. No evidence of reversion to virulence was noted. The pigs used in this experiment remained healthy in appearance, and a vaccine prepared from the fifth pig passage was found to protect pigs as well as the original vaccine.

From tests on a large number of pigs, I have concluded that the optimum age for vaccination is about 8–15 weeks. Pigs challenged with virulent Group E Streptococcus organisms at ages of less than 8 weeks do not usually develop abscesses as a result of such challenge, and susceptible pigs challenged at more than 10 weeks of age usually do develop abscesses.

In further laboratory-controlled tests of the vaccine of this invention, it was found that out of 37 pigs vaccinated and then challenged two weeks later with virulent organisms, only two developed abscesses; in this same series of tests 19 out of 20 unvaccinated controls did develop abscesses on challenge.

My vaccine was field tested on a midwestern hog farm with a past record of frequent occurrence of jowl abscess. Out of 147 pigs of 10–15 weeks of age, 101 were vaccinated, and 46 were left as controls, running in the same pen with the vaccinates; only 4 vaccinates had developed abscesses at market age two months later, whereas 26 of the controls had. On this same farm, a group of 151 pigs aged 10–15 weeks was vaccinated and thereafter maintained on presumptively infected lots where abscess incidence of over 50% had been observed in previous years. In this herd only four cases of jowl abscess were found three months later at slaughter. These field tests, under unusually severe conditions of natural exposure challenge, show that use of my new vaccine can greatly reduce the incidence of jowl abscesses in swine.

I have found that good protection is achieved by vaccinating with as few as $10^7$ viable organisms or as many as $10^{10}$. The volume of liquid in which these are suspended at the time of vaccination is not critical, and may be varied widely. I prefer to use between 0.5 ml. and 5 ml., though more or less may be used. Use of relatively small volumes tends to result in better adherence in the animal's throat and is therefore preferred.

As indicated above, pigs aged less than about 8 weeks seem to be able to resist infection by virulent abscess-producing Group E Streptococci and do not benefit fully from vaccination with my attenuated strain. Vaccination with my attenuated strain at age 10 weeks or more appears to protect the animals at least until the time of normal marketing. For animals retained for breeding, vaccination a week or two before breeding is desirable to provide continued protection.

What is claimed is:

1. A method of preparing an orally effective live vaccine capable of reducing the incidence of jowl abscesses in swine which comprises the steps of recovering virulent hemolytic Group E Streptococci from a hog jowl abscess, culturing said streptococci in successive portions of horse infusion broth containing acriflavine, the concentration of acriflavine being at first about one part per million and being gradually increased to about 10–20 parts per million, culturing the resulting acriflavine-adapted Streptococcus on blood agar plates, selecting a relatively non-hemolytic colony from said plates, subculturing said non-hemolytic colonies, seeding a horse infusion broth free of acriflavine with said subcultured line of non-hemolytic streptococcus, maintaining said seeded broth under conditions for satisfactory bacterial growth until a concentration of at least about $10^8$ live cells per cc. is attained, and lyophilizing the resulting product.

2. A free-dried culture of the acriflavine attenuated strain of the Group E Streptococcus having the ATCC reference number 21223, prepared in accordance with claim 1, and a free-drying stabilizer additive.

3. A vaccine composition comprising the live acriflavine attenuated strain of Group E Streptococcus having the ATCC reference number 21223, prepared in accordance with claim 1, in a pharmaceutically acceptable diluent.

4. A vaccine in unit dosage form for oral administration to pigs comprising the attenuated strain of Group E Streptococcus having the ATCC reference number 21223, prepared in accordance with claim 1 in a pharmaceutically acceptable diluent, the number of viable bacteria in the unit dose being from about $10^7$ to about $10^{10}$.

5. A method of preventing the development of jowl abscesses in swine which includes application to the interial surfaces of a pig's mouth and throat of an effective amount of a vaccine comprising a live culture of an acriflavine attenuated strain of an acriflavine-adapted Group E Streptococcus, prepared in accordance with claim 1 and a pharmaceutically acceptable diluent.

References Cited

Vet. Bull. 35, #718 (1965); Kostyra, J. et al., Annls. Univ. Mariae—Sklodowska Sect. DD 17, pp. 313–340 (1964), "Aetiology and treatment of Abscesses in Pigs."

Vet. Bull. 35, #498 (1965); Deibel, R. H. et al., J. Infect. Dis 114·327–332 (1964); "Groupe Streptococci. I. Physiological Characterization of Strains Isolated from Swine Cervical Abscesses."

Vet. Bull. 36 #1282 (1966); Conner, G. H. et al., J. Am. Vet. Med. Assn. 147:479–483 (1965), "Evaluation of Bacterins for Control of Swine Abscesses."

Vet. Bull. 37 #482 (1967); Armstrong, C. H., Diss. Abstr. 27B:354 (1966), "A Partial Evaluation of the Morphologic Physiologic, and Serologic Characterisitcs of Streptococcus Group E recovered from cervical lymphadenitis of swine."

SHEP K. ROSE, Primary Examiner